Nov. 26, 1946.    G. T. BRADLEY    2,411,500
CONTROL FOR AUTOMOBILES
Filed Feb. 1, 1945    2 Sheets-Sheet 1
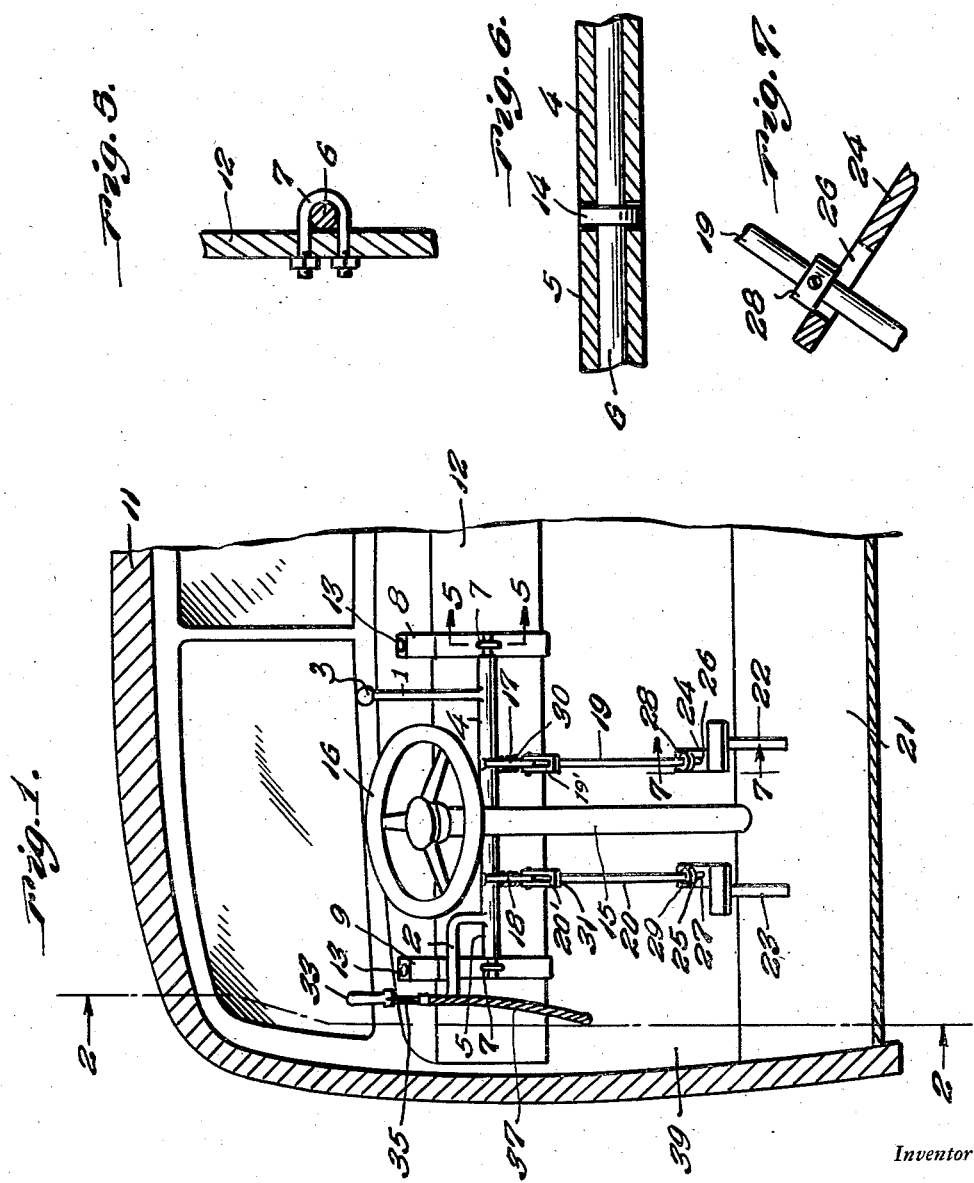
Inventor
George T. Bradley
By Clarence A. O'Brien
and Harvey B. Jacobson
Attorneys

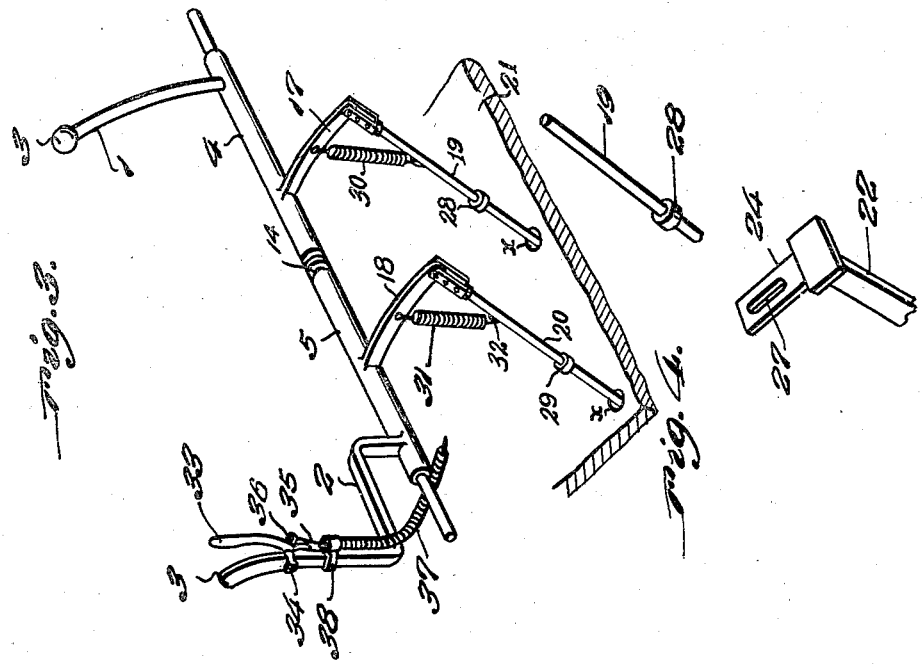
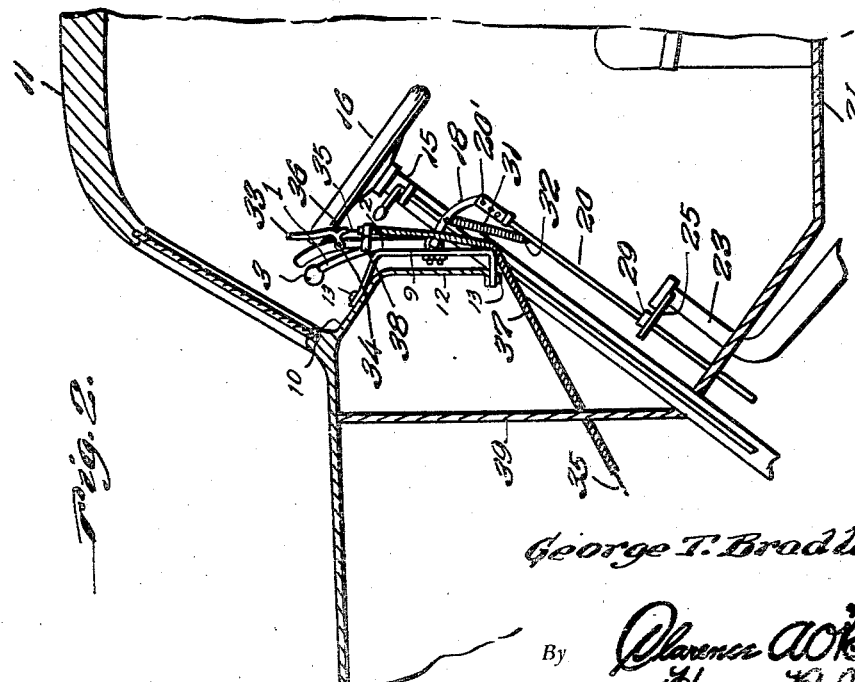

Patented Nov. 26, 1946

2,411,500

UNITED STATES PATENT OFFICE 2,411,500

CONTROL FOR AUTOMOBILES

George T. Bradley, Kerens, Tex.; Louise N. Bradley administratrix of said George T. Bradley, deceased Application February 1, 1945, Serial No. 575,701

3 Claims. (Cl. 74—481)

My invention relates to improvements in auxiliary controls for automobiles, the primary object in view being to equip such vehicles with simply constructed, inexpensive means for operating the clutch and brake pedals, also the throttle valve of the carburetor, quickly and easily, by hand, and which is especially adapted for installation in present day automobiles without necessitating material alteration of the same, and does not interfere with foot operation of the clutch and brake pedals.

To the accomplishment of the above, and subordinate objects presently appearing, a preferred embodiment of my invention has been illustrated in the accompanying drawings, set forth in detail in the succeeding description, and defined in the claims appended hereto.

In said drawings:

Figure 1 is a fragmentary view in transverse section through the body of an automobile illustrating my improved control in rear elevation, Figure 2 is a view in vertical section taken on the line 2—2 of Figure 1, Figure 3 is a view in perspective of the right and left hand levers, the sleeves of said levers, the shaft upon which the sleeves are mounted and parts associated with the left hand lever and said sleeves, Figure 4 is a view in perspective of one of the pedals, the operating bar therefor, and the push rod associated with the pedal, Figure 5 is a detail view in vertical section taken on the line 5—5 of Figure 1 and drawn to an enlarged scale, Figure 6 is a fragmentary view in longitudinal section through the sleeves mounted on the shaft, Figure 7 is a detail view in section taken on the line 7—7 of Figure 1.

Reference being had to the drawings by numerals, my improved auxiliary control, as illustrated, comprises, as the basic elements thereof, a right and a left hand, upstanding lever 1, 2, respectively, with hand grip ends 3 and which rise from a pair of horizontal sleeves 4, 5 rotatably mounted in end-to-end relation on a horizontal shaft 6 having the ends thereof mounted by U bolts 7 on a pair of right and left hand clip-like bracket bars 8, 9 straddling the cowl 10 inside the body 11 of the automobile and the instrument panel 12, and secured to the cowl 10, as by bolts 13. A spacing collar 14 on the shaft 6 is interposed between the sleeves 4, 5. As best shown in Figure 1, the levers 1, 2 are arranged upon opposite sides of the steering post column 15 and the steering wheel 16. The left hand lever 2 may be of the right angled form shown, for a purpose presently seen. A pair of rearwardly extending crank arms 17, 18 are provided on the sleeves 4, 5 of the right and left hand levers 1, 2.

A pair of right and left hand push rods 19, 20 incline downwardly and forwardly through the floor 21 of the body 11 forwardly of the brake and clutch pedals 22, 23, with lower ends slidably extended suitably through said floor and to tilt therein for a purpose presently apparent. A pair of suitable clevises 19', 20' adjustably connect the upper ends of said rods 19, 20 to the crank arms 17, 18.

As will presently more clearly appear, the crank arms 17, 18 swing through arcs and thereby tilt the push rods 19, 20 in the floor 21 at the points X, where the lower ends thereof slide through the floor.

The brake and clutch pedals 22, 23 are provided with forwardly extending operating bars 24, 25 suitably fixed thereon and having slots 26, 27 therein through which said push rods 19, 20 extend, and said rods 19, 20 are provided with collars 28, 29 fast thereon and overlying said bars 24, 25. A pair of coil springs 30, 31 suitably attached at one end to the push rods 19, 20, as at 32, with the other ends thereof similarly attached to the crank arms 17, 18 function to yieldingly hold said rods 19, 20 and the crank arms 17, 18 in a normal position against downward movement, also the levers 1, 2 in a normal forward position.

In explanation of the action of the coil springs 30, 31, the push rods 19, 20 and the crank arms 17, 18 form elbow joints with said rods and crank arms normally in substantially right-angled relation. Obviously, if such joints, or in other words, said rods and crank arms, are moved so as to straighten the same out, the springs 30, 31 will be stretched, thereby exerting increasing tension on said rods and crank arms tending to move the same back into right-angled relation, and in so doing tending to cause the sleeves 4, 5 and the levers 1, 2 to move back into normal position.

A hand grip lever 33 is pivoted, as at 34, to the upper end of the left hand lever 2 and to which one end of a "Bowden" wire 35 is connected, as at 36, with the sheath 37 thereof suitably fixed at one end, as by a clamp 38, to said lever 2. Said wire 35 is suitably extended forwardly through the dash 39 for connection to the throttle valve of the carburetor, not shown, of the automobile, the arrangement being such that by gripping the hand lever 33 and the upper end of the lever 2, a pull may be exerted on said wire 35, by the resulting swinging of said lever 33 toward the lever 2, such pull opening said throttle valve.

The operation of the described invention will be readily understood. By pulling rearwardly on the right hand lever 1, the crank arm 17 is swung downwardly to thrust the push rod 19 downwardly and engage the collar 28 with the operating bar 24 of the brake pedal 22 whereby said brake pedal is depressed. By pulling the left hand lever 2 rearwardly, the clutch pedal 23 is depressed in a similar manner through the medium of the crank arm 18, push rod 20, collar 29 and operating bar 27. The coil springs 30, 31 function in the manner already described to return the levers 1, 2 to normal forward position and by such return of said levers 1, 2 the push rods 19, 20 are elevated to normal position in a manner which will be clear. In the normal position of the push rods 19, 20, the brake and clutch pedals 22, 23 may be operated in the usual manner, by foot. The manner in which the hand grip lever 33 and "Bowden" wire 35 operate the throttle valve of the carburetor has already been described. The clevises 19', 20' provide for adjusting the connection between the push rods 19, 20 and the crank arms 17, 18, as occasion may require.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. The combination with an automobile body instrument panel, and brake and clutch pedals, respectively, of hand-operated means for depressing said pedals selectively comprising a horizontal shaft mounted in said body in front of said panel, a pair of hand levers mounted on said shaft in upstanding position and to rock thereon from a normal position, a pair of crank arms extending rearwardly from said levers, a pair of upstanding push rods slidably extended at the lower ends thereof through the floor of said body in front of said pedals, respectively, operating connections between said crank arms and the upper ends of said push rods, and pick-up connections between said push rods and said pedals respectively.

2. The combination with an automobile body instrument panel, and brake and clutch pedals, respectively, of hand-operated means for depressing said pedals selectively comprising a horizontal shaft mounted in said body in front of said panel, a pair of hand levers mounted on said shaft in upstanding position and to rock thereon from a normal position, a pair of crank arms extending rearwardly from said levers, a pair of upstanding push rods slidably extended at the lower ends thereof through the floor of said body in front of said pedals, respectively, operating connections between said crank arms and the upper ends of said push rods, and pick-up connections between said push rods and said pedals, respectively, said connections comprising forwardly extending bars on said pedals having slots therein through which said rods extend, and fixed collars on said rods overlying said bars.

3. The combination with an automobile body instrument panel, and brake and clutch pedals, respectively, of hand-operated means for depressing said pedals selectively comprising a horizontal shaft mounted in said body in front of said panel, a pair of hand levers mounted on said shaft in upstanding position and to rock thereon from a normal position, a pair of crank arms extending rearwardly from said levers, a pair of upstanding push rods slidably extended at the lower ends thereof through the floor of said body in front of said pedals, respectively, operating connections between said crank arms and the upper ends of said push rods, pick-up connections between said push rods and said pedals, respectively, and springs connected to said crank arms and push rods for maintaining said levers, cranks and rods in normal position.

GEORGE T. BRADLEY.